US006266832B1

(12) United States Patent
Ezell

(10) Patent No.: US 6,266,832 B1
(45) Date of Patent: Jul. 31, 2001

(54) INFANT CRANIAL SUPPORT SYSTEM

(76) Inventor: Pamela A. Ezell, 9830 E. Kleindale Rd., Tucson, AZ (US) 85749

( * ) Notice: Subject to any disclaimer, the term of this patent is extended or adjusted under 35 U.S.C. 154(b) by 0 days.

(21) Appl. No.: 09/577,853

(22) Filed: May 25, 2000

(51) Int. Cl.[7] .............................. A47D 15/00; A47G 9/00
(52) U.S. Cl. ................... 5/640; 5/636; 5/655; 297/393; 297/397; 297/219.12; 297/220
(58) Field of Search ............................. 5/636, 655, 637, 5/644, 640; 297/393, 397, 219.12, 220

(56) References Cited

U.S. PATENT DOCUMENTS

| | | | | |
|---|---|---|---|---|
| 673,872 | * | 5/1901 | Von Hillern-Flinsch | 297/393 |
| 3,848,281 | * | 11/1974 | Matthews | 5/636 |
| 4,383,713 | * | 5/1983 | Roston | 297/219.12 |
| 4,617,691 | * | 10/1986 | Monti et al. | 5/640 |
| 4,768,246 | * | 9/1988 | Summer | 5/636 |
| 5,127,120 | * | 7/1992 | Mason | 5/655 |
| 5,261,134 | * | 11/1993 | Matthews | 5/655 |
| 5,310,245 | * | 5/1994 | Lyszczasz | 5/655 |
| 5,916,089 | * | 6/1999 | Ive | 5/655 |
| 6,088,855 | * | 7/2000 | Connolly | 5/637 |

* cited by examiner

Primary Examiner—Alexander Grosz
(74) Attorney, Agent, or Firm—Cahill, Sutton & Thomas P.L.C.

(57) ABSTRACT

An infant cranial support system particularly adapted to cushion and support the head of an infant carried in an infant restraining car seat. A first toroidal cushion is configured and sized to receive the posterior region of the infant's skull and is provided with a relieved region next to the neck of the infant. A second toroidal cushion is preferably provided to encircle the neck of the infant to cushion against lateral and forward motion of the head. The first and second cushions may be releasably attached to each other. And at least one strap fastener may be provided for attaching the system to the restraining straps of the car seat.

6 Claims, 4 Drawing Sheets

INFANT CRANIAL SUPPORT SYSTEM

TECHNICAL FIELD

This invention is concerned with cushioning and supporting an infant's head to lessen the likelihood of cranial deformation from contact with non-cushioned surfaces.

BACKGROUND ART

The skull bones of a new born infant are separated from each other by membranous intervals, termed fontanelles. In a normal infant these spaces are gradually filled in by an ossifying process although this can take one to two years for completion.

In the meantime, the skull can become misshapen from repeated pressure on the same area of the skull. The condition, known as positional plagiocephaly, can occur when, for example, an infant favors sleeping in the same position most of the time or spends too much time with his or her head flattened against a crib mattress or the back of an infant car seat or carrier seat.

U.S. Pat. No. 3,848,281, granted Nov. 19, 1974 to Dixie I. Mathews for "Apertured Article and Protective Cover Therefor" discloses a donut shaped cushion touted as an infant head rest. However, the patent is directed primarily to the cover system for the cushion and because the cushions disclosed have substantially uniform, rectangular cross-sections the cushions do not conform well to the cranial and neck regions of an infant.

The "Infant Support Pillow" disclosed in U.S. Pat. No. 5,261,134 granted Nov. 16, 1993 to Susan H. Matthews is intended to support the entire body of an infant or the upper torso of an older child. The patent is concerned with preventing tilting movement of the child and no reference is made to cranial distortions.

U.S. Pat. No. 4,617,691 granted Oct. 21, 1986 to Martha S. and Gilbert L. Monti for "Support Pillow" discloses several pillow configurations which go around the neck to cushion the head and neck when the child falls asleep and the head falls to the side or forward.

There continues to be a need for a cranial support system which can be relied on to substantially reduce and possibly prevent positional plagiocephaly in infants.

SUMMARY OF THE INVENTION

The invention contemplates providing a first toroidal cushion shaped to cradle the posterior of the infant's skull out of contact with a surface at the rear of the cushion. This cushion is relieved in the region of the neck of the infant. The relief may take the form of a discontinuity in the cushion toroid or a reduced thickness from front to rear.

The invention further contemplates the provision of a second toroidal cushion with a discontinuity that enables this cushion to be placed around the neck of the infant to cushion the head against lateral and forward movement. The first and second cushions when used together are preferably releasably attached to each other.

BRIEF DESCRIPTION OF THE DRAWINGS

The invention is described in greater detail hereinafter by reference to the accompanying drawings wherein.

DETAILED DESCRIPTION OF THE INVENTION

Figure 1:
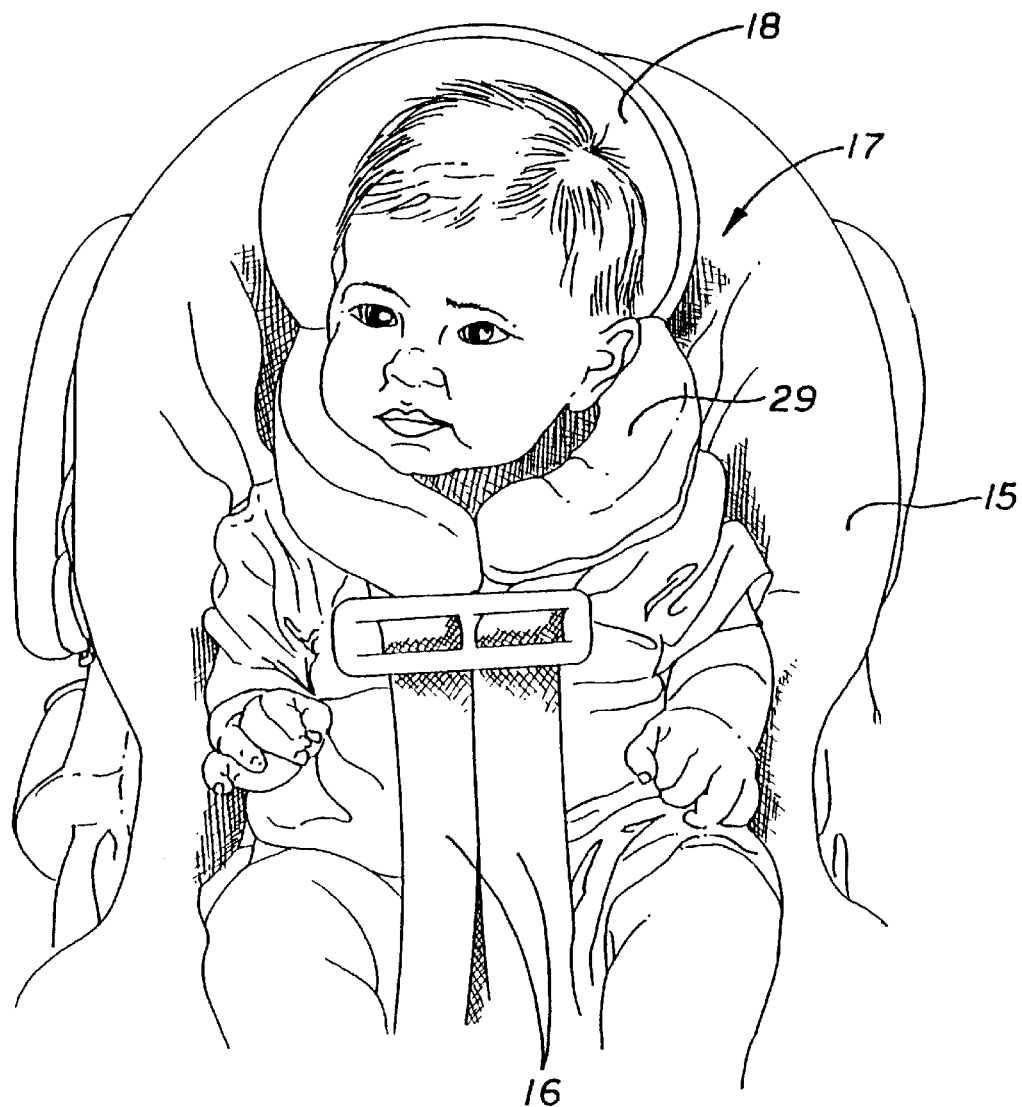
FIG. 1 is a pictorial illustration from the front of an infant employing the cranial support system of this invention in a car seat.

Referring initially to FIG. 1 there is illustrated an infant in a semi-upright sitting position in a restraining car seat identified by reference numeral 15. As there shown the car seat restraining system includes a pair of straps 16 which extend from the back of the car seat over the shoulders of the infant and down between the infant's legs to an attachment to the car seat (not shown).

Figure 2:
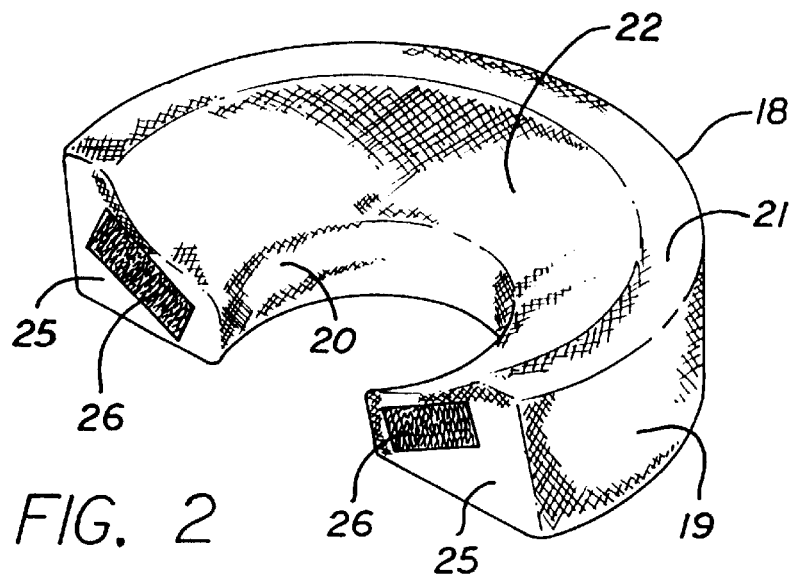
FIG. 2 is a perspective view of a first cushion employed in the support system and adapted to cushion the posterior of the infant's skull.
Figure 3:
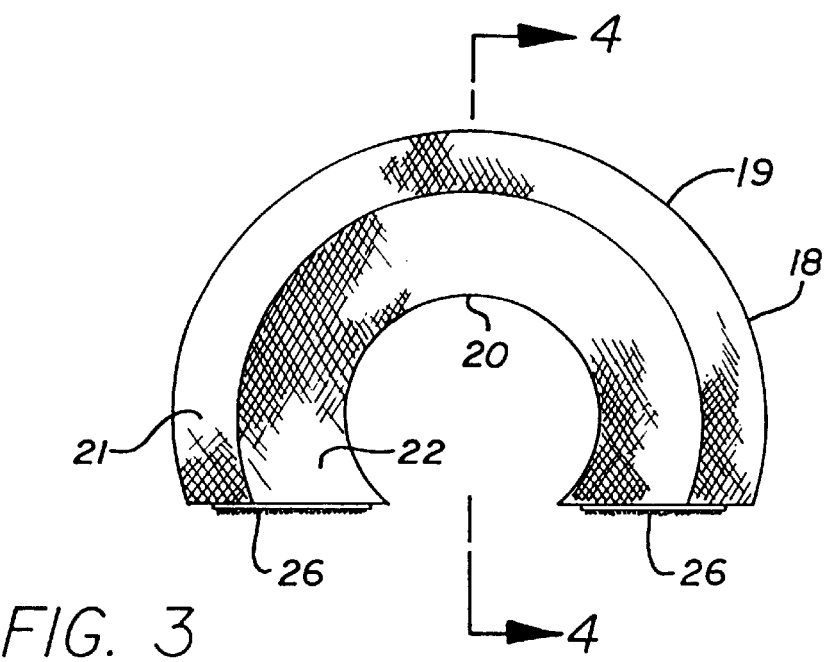
FIG. 3 is a front view of the cushion of FIG. 2.
Figure 4:
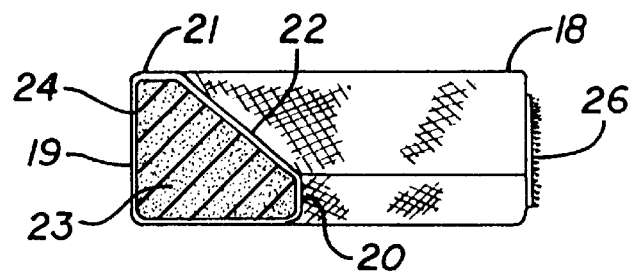
FIG. 4 is a sectional view of the first cushion taken as indicated by line 4—4 in FIG. 3.
Figure 5:
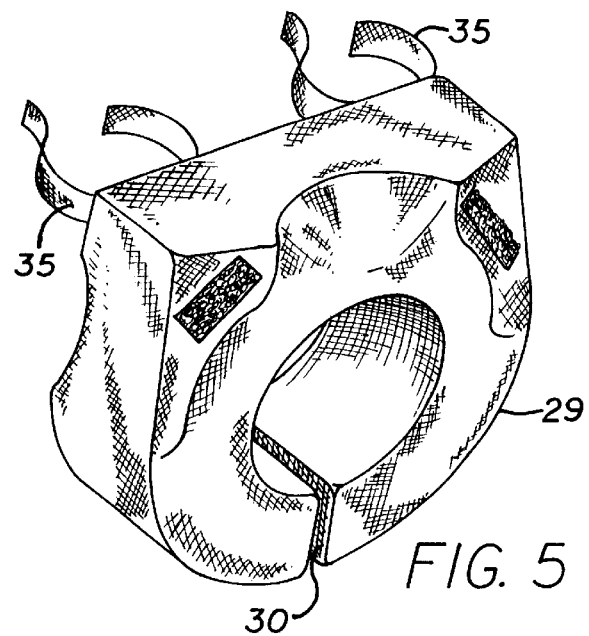
FIG. 5 is a perspective view of a second cushion employed in the support system and adapted to encircle the neck of the infant and cushion against lateral and forward tilting of the head.
Figure 8:
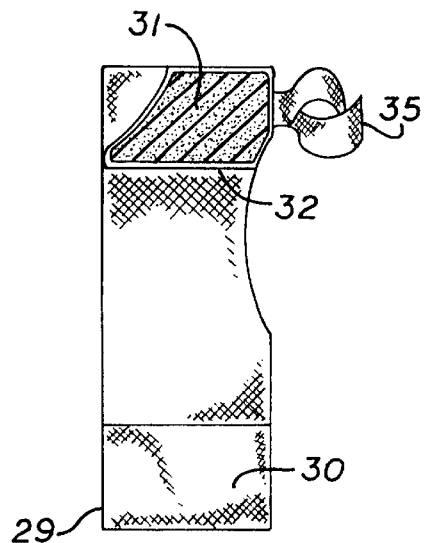
FIG. 8 is a sectional view of the second cushion taken as indicated by line 8—8 in FIG. 7.
Figure 7:
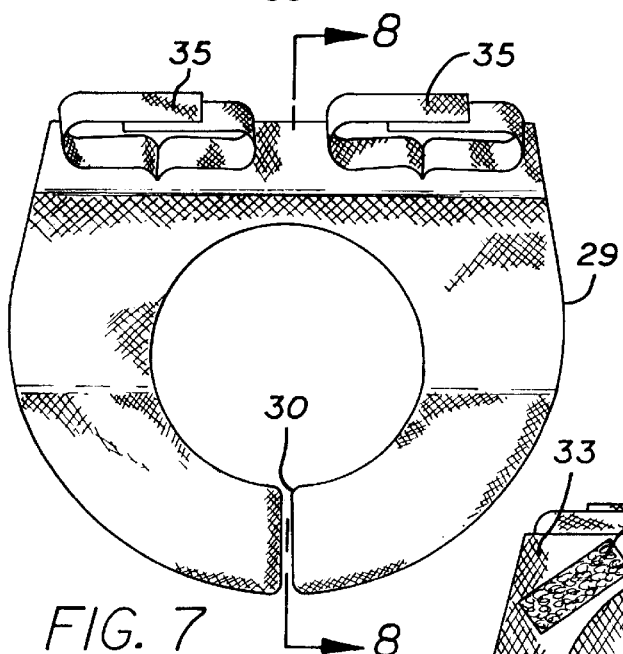
FIG. 7 is a bottom view of the cushion of FIG. 5.
Figure 6:
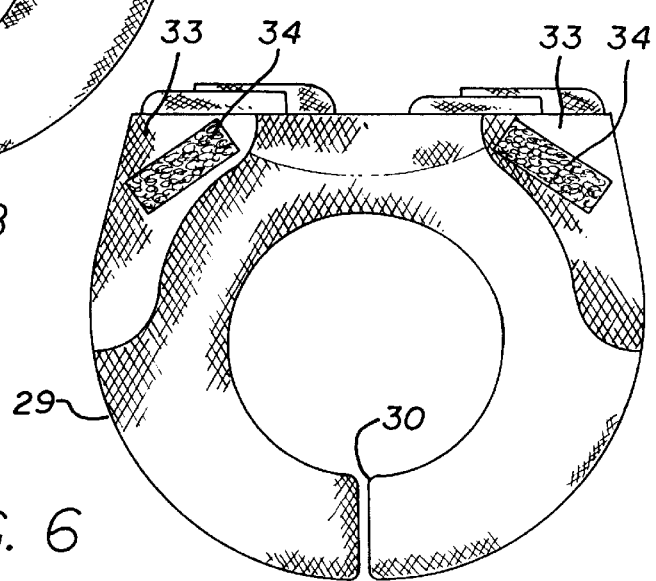
FIG. 6 is a top view of the cushion of FIG. 5.

In accordance with this invention the infant's skull is cushioned against contact with the back of the car seat 15 and the head is cushioned against lateral and forward movement by a cranial support system designated generally by reference numeral 17 and comprising two toroidal cushions 18 and 29. Details of the first cushion 18 are illustrated in FIGS. 2–4 and details of the second cushion 29 are illustrated in FIGS. 5–8.

First cushion 18 receives, supports and cushions the posterior region of the infant's skull thereby preventing the skull from contacting and being pressed into the back of the car seat 15. Cushion 18 has a toroidal configuration with a radial cross section in which the outer face 19 is taller than the inner face 20 so the cushion cradles the infant's cranium.

The cross section of cushion 18 is preferably pentagonal with the smaller of the five faces being at the inner face 20 and the front face 21. The sloping region 22 of the cushion 18 provides a substantial area for contact with the skull of the infant to reduce pressure on any particular area of the skull.

The body 23 of cushion 18 is preferably formed of foamed elastic material such as foamed rubber or foamed plastic, such as, polyurethane or polyethylene. The cushion body 23 is preferably covered on all sides by a soft, washable knit fabric 24.

Cushion 18 is preferably configured to provide a relieved region in the vicinity of the infant's neck. In the cushion 18 illustrated in FIGS. 2–4 this relieved region is provided by a discontinuity in the cushion. The ends 25 of the cushion 18 at the discontinuity preferably carry one of the two elements 26 of hook and loop separable fasteners by which cushion 18 can be detachably attached to cushion 29.

Cushion 29 also has a toroidal configuration with a discontinuity at 30 which permits the cushion to be spread open to be placed around the neck of the infant. The body 31 of cushion 29 is formed of foamed plastic material and is covered by a soft, washable knit fabric 32. Cushion 29 has flat regions 33 on its upper rear surface which have the other element 34 of hook and loop separable fasteners to mate with the elements 26 on cushion 18.

The underside of cushion 29 has attached thereto at least one and preferably two strap fasteners 35. The strap fasteners 35 have hook and loop fastener elements on their distal ends which permit the fasteners 35 to be secured around the car seat straps 16 to stabilize the support system 17 in relation to the car seat and the infant.

As mentioned previously, the cranial support system 17 detailed in FIGS. 1 to 8 is intended for use with the infant in a nearly upright sitting position in a car seat or carrier. With this system cushion 29 cushions the infant's head should the infant fall asleep and allow its head to fall to one side or forward. The possibility of neck injury is thus avoided.

Figure 9:
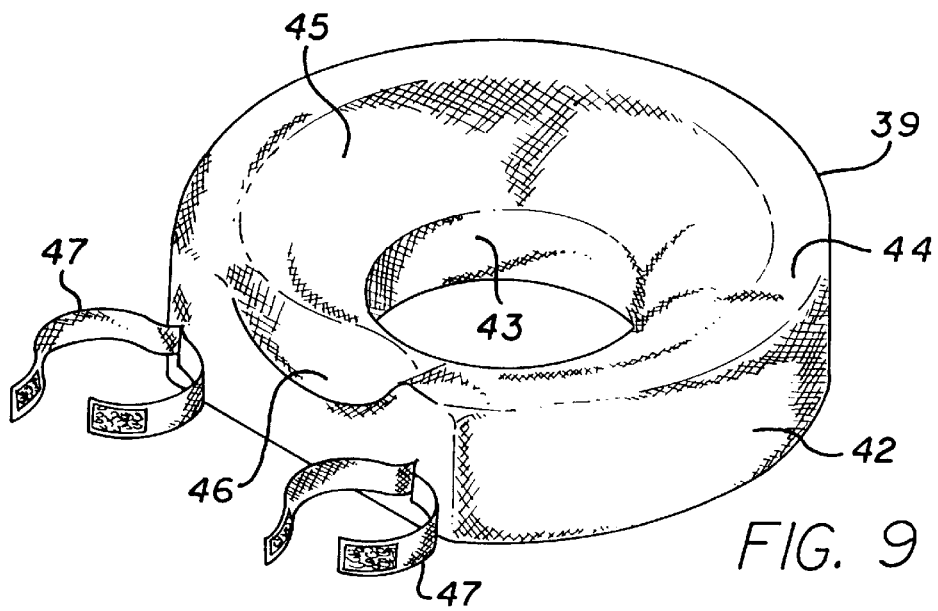
FIG. 9 is a perspective view of a modification of the first cushion adapted to be used by itself to cushion the posterior of the infant's skull.
Figure 10:
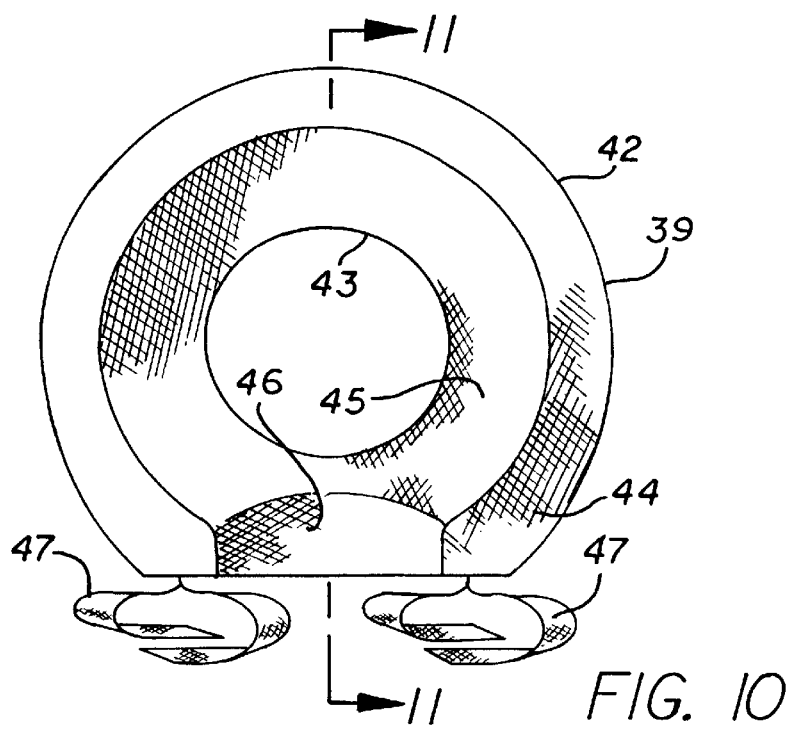
FIG. 10 is a front view of the cushion of FIG. 9.
Figure 11:
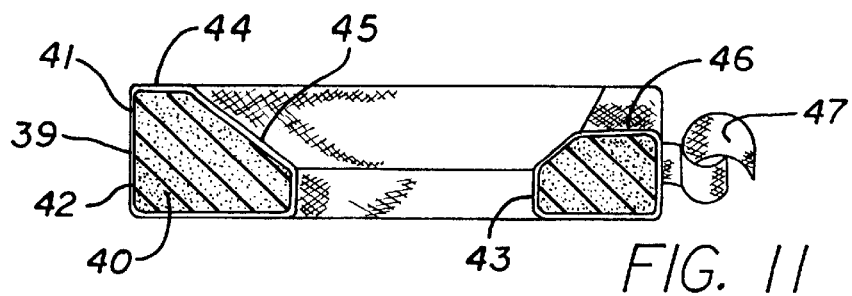
FIG. 11 is a sectional view of the cushion of FIGS. 9 and 10 taken as indicated generally by line 11—11 in FIG. 10.

If the infant is lying supine in a crib or carrier the likelihood of neck injury is greatly reduced permitting a slightly modified cranial support system to be employed to prevent positional plagiocephaly. That system is illustrated in FIGS. 9–11 and comprises a toroidal cushion 39.

Cushion 39 has a resilient foam body 40 with a soft, knit fabric cover 41. Like cushion 18, cushion 39 has an outer face 42 which is thicker than its inner face 43 so the cushion can cradle the posterior of the infant's skull. Also, the cross section of cushion 39 is preferably pentagonal with the smaller of the five faces being at the inner face 43 and the upper, or front, face 44. The sloping regions 45 of the cushion provides a substantial area for contact with the skull of the infant to reduce pressure on any particular area of the skull.

Cushion 39 is also configured to provide a relieved region 46 in the vicinity of the infant's neck. In this instance the relieved region 46 is a section of reduced thickness between the front and rear faces of the cushion.

Cushion 39 may also have secured thereto one or more strap fasteners 47 to stabilize the cushion on a seat or carrier.

From the foregoing it should be apparent that this invention provides an improved infant cranial support system.

What is claimed is:

1. An infant cranial support system comprising a first toroidal cushion having a front face, a rear face, an inner face and an outer face, the inner face of the cushion being shorter than the outer face, said cushion being sized to receive the posterior region of the infant skull against the front face of the cushion and out of contact with a surface at the rear face of the cushion, said cushion being relieved in the region thereof next to the neck of the infant and a second toroidal cushion adapted to encircle the neck region of the infant and having a rear region positioned adjacent the relieved region of said first mentioned cushion, and means for releasably attaching said second cushion to the first cushion.

2. The cranial support system of claim 1 wherein said second cushion has a discontinuity in a forward region thereof.

3. The cranial support system of claim 1 wherein said second cushion has at least one strap fastener at a rear region thereof whereby the said second cushion can be connected to at least one strap of an infant restraining car seat.

4. An infant cranial support system comprising a toroidal cushion having a front face, a rear face, an inner face and an outer face, said cushion having a pentagonal cross section with two smaller sides respectively at the inner face and the front face of the cushion, said cushion being sized to receive the posterior region of the infant skull on the region of the cushion between the front face and the inner face and out of contact with a surface at the rear face of the cushion, said cushion being relieved in the region thereof next to the neck of the infant and a second toroidal cushion adapted to encircle the neck region of the infant and having a rear region positioned adjacent the relieved region of said first mentioned cushion, and means for releasably attaching said second cushion to the first cushion.

5. The cranial support system of claim 4 wherein said second cushion has a discontinuity in a forward region thereof.

6. The cranial support system of claim 4 wherein said second cushion has at least one strap fastener at a rear region thereof whereby the said second cushion can be connected to at least one strap of an infant restraining car seat.

* * * * *